June 2, 1931.  C. SANDLER  1,807,935
SHOE HEEL
Filed Oct. 24, 1929
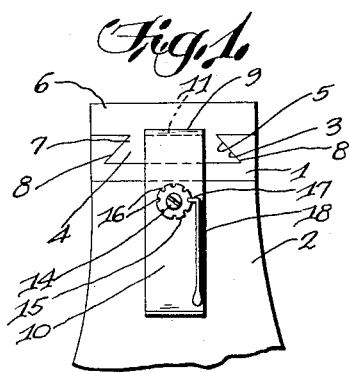
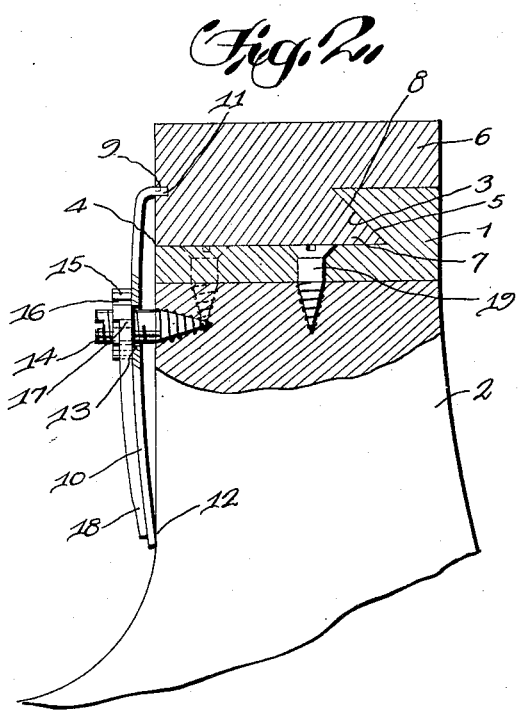
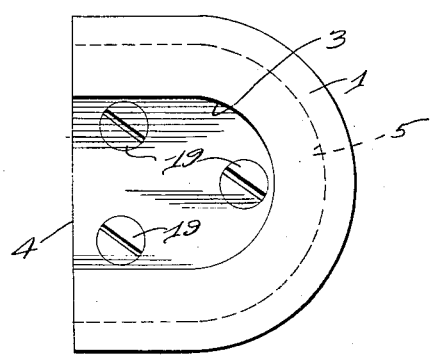
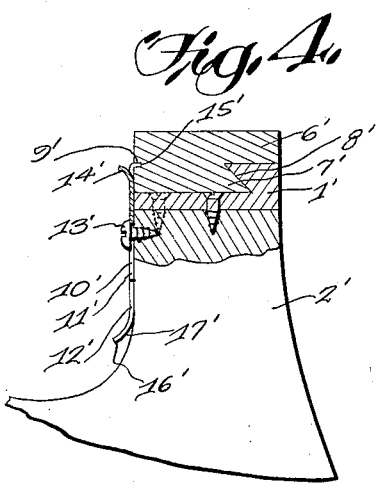
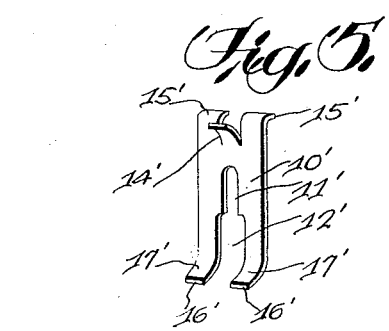
Inventor
Carl Sandler
By Arnold Ehrlich
Attorney Patented June 2, 1931

1,807,935

UNITED STATES PATENT OFFICE

CARL SANDLER, OF MILWAUKEE, WISCONSIN

SHOE-HEEL

Application filed October 24, 1929. Serial No. 402,181.

This invention relates to new and useful improvements in shoe-heels and more particularly to a removable tread portion therefor.

One of the objects of my invention is the provision of a removable tread portion for the heels of shoes whereby either with the use of a leather or rubber heel the tread portion can be easily replaced when the same becomes worn beyond a useful extent.

Another object of the invention is the provision of a removable tread portion for shoe-heels which can be readily placed in position or removed when worn and when in position has novel means for maintaining the same in place and also provide means whereby the removable tread can be easily removed when desired.

With the above and other objects in view the invention consists in the novel features of construction, the combination and arrangement of parts hereinafter more fully set forth pointed out in the claim and shown in the accompanying drawings in which Figure 1 is a side elevation of a shoe-heel illustrating the application of my improved removable tread.

Figure 2 is a detail vertical sectional view of a shoe-heel showing the tread locked in place.

Figure 3 is a plan view with the tread removed.

Figure 4 is a detail vertical sectional view illustrating a slightly modified form of the invention, and Figure 5 is a detail perspective view of the clamping plate used in the modified form.

Referring more particularly to the drawings it will be noted that in constructing a shoe-heel for the application of my improved removable tread a lift part 1 is attached to the heel portion 2 and this lift portion is formed with a pocket 3 one side of which is left open as shown at 4 thus forming a substantially U-shaped open sided pocket the walls of which are undercut to form a substantially V-shaped recess 5.

The tread portion 6 of the removable part is formed with an extension portion 7 having tapering side walls 8 and is of U-shaped design so as to fit snugly in the pocket 3 of the lift with its tapering side walls 8 fitting in the V-shaped recess 5. The inner end of the removable part is formed with a short transverse recess 9 at a central point and on the line where the extension 7 joins the tread portion 6.

In order to removably secure the tread to the lift part 1 I provide a bowed spring clamping plate 10 one end of which is laterally disposed to form an engaging flange 11 which is engaged in the recess 9 when clamping the removable part in place. The inner end of the spring engages an inwardly curved part of the shoe-heel 2 as shown at 12 and the central portion of the plate is formed with an aperture 13 to loosely receive the attaching screw 14 which is screwed into the solid heel portion 2. The outer end of this screw extends a considerable distance beyond the outer surface of the heel 2 and is formed with a transverse aperture to receive a screw driver or other instrument.

Adjustably mounted on the screw is a clamping nut 15 the perimeter of which is formed with a plurality of transverse grooves 16 any one of which is adapted to receive the lateral end 17 of a spring pawl 18. This pawl 18 as shown is attached at its outer end to the plate 10 adjacent its inner end or it may be formed integral therewith if found desirable. In the construction of the shoe-heel the lift 1 is secured to the main portion of the heel 2 by means of screws 19 although other similar fastening means may be employed.

In placing the tread portion in position the extension 7 is fitted in the pocket 3 and the clamping plate 10 is mounted upon the outer end of the screw 14. The lateral end 11 is then engaged in recess 9 and nut 15 is threaded onto the outer end of the screw until it is brought into engagement with the clamping plate. It will be noted from this that the nut 15 can be screwed up tightly against the plate and the pressure on the plate can be readily adjusted to securely hold the removable part in place on the heel. It will be apparent that by adjusting the nut on the screw 15 the pressure on the plate 10 can be regulated and the pawl 17 will securely hold the nut against retrograde movement.

It will be apparent from the foregoing that I have provided a simple and inexpensive removable tread portion for shoe-heels whereby when the outer rubber or leather tread on shoe-heels become worn it can be quickly and easily replaced by a new one.

Referring to Figures 4 and 5 of the drawings it will be noted that I have shown a modified form wherein the construction includes a lift part 1' attached to the heel 2' and this lift portion is formed with a pocket one side of which is left open to form a substantially U-shaped open sided pocket the walls of which are undercut to form a substantially V-shaped recess.

The tread portion 6' of the removable part is formed with an extension portion 7' having tapering side walls 8' and is substantially U-shaped so as to fit snugly in the pocket of the lift with its tapering side walls 8' fitting in the V-shaped recess. The removable part is formed with a transverse recess 9' similar to the recess 9.

In placing the removable tread in position the offset part 7' is fitted within the pocket and in order to retain the same in this position I provide a detachable clamping member which comprises a body portion 10' having a longitudinal slot 11' formed with an enlarged outer end portion 12' to receive therethrough the headed pin or screw 13' carried by the heel 2' adjacent the lift 1'.

The body 10' at the end opposite the slot 11' is provided with spaced slits forming a plurality of tongues, with the central tongue 14' curved outwardly from one side of the body to form a finger piece while the outside tongues 15' are curved inwardly to form engaging members adapted to engage the recess 9' as shown in Figure 4 to hold the portion 7' within the pocket and prevent removal of the tread 6' from the heel.

The enlarged part 12' of the slot 11' leaves spaced fingers at the end of the body opposite the tongues 15' and these fingers 16' have their outer ends curved outwardly as shown at 17' to form finger engaging portions to facilitate removal of the clamping member from the pin or screw 13' and the disengagement of the tongues 15' from the recess 9'.

In placing the clamping member in position the enlarged part of the slot 11' is engaged with the pin or screw 13' and then the clamping member is forced downwardly so that the pin or screw engages in the slot 11' with the head thereof bearing against the body of the clamping member and further downward movement of the clamping member will bring the tongues 15' into the recess 9 so as to securely retain the removable portion of the heel in place.

It will be noted that the clamping member in this form of the invention is so positioned with respect to the heel that when the clamping member is forced onto the headed pin or screw the frictional engagement of the clamping member with the heel will securely hold the said member against displacement until a person's fingers are engaged with out turned portions 14' and 17' to move the clamping member outwardly on the headed pin or screw 13'.

While I have shown and described the preferred embodiment of my invention it will be apparent that various changes can be made when putting the invention into practice without departing from the spirit of the invention or the scope of the appended claim.

Claim:

The combination with a shoe-heel having a lift attached thereto, of a tread removably attached to the lift and provided with a recess, a removable yieldable clamping plate carried by the heel and normally spaced from the heel with one end engaged in the recess, and means for holding said clamping plate in place and adjusting the pressure of said plate against the removable tread.

In witness whereof I have hereunto set my hand this 26th day of September, A. D. 1929.

CARL SANDLER.